United States Patent [19]

Natori

[11] Patent Number: 4,980,761
[45] Date of Patent: Dec. 25, 1990

[54] IMAGE PROCESSING SYSTEM FOR TELECONFERENCE SYSTEM
[75] Inventor: Hiroaki Natori, Kawasaki, Japan
[73] Assignee: Fujitsu Limited, Kawasaki, Japan
[21] Appl. No.: 395,086
[22] Filed: Aug. 17, 1989
[30] Foreign Application Priority Data
Aug. 17, 1988 [JP] Japan .................... 63-204154
[51] Int. Cl.$^5$ .............................. H04N 7/14
[52] U.S. Cl. ..................... 358/85; 358/136; 379/202; 379/205
[58] Field of Search .................. 358/87, 181, 85, 210, 358/105, 133–138, 125, 108, 229, 146; 379/54, 53, 202, 203, 204, 205, 52, 53

[56] References Cited
U.S. PATENT DOCUMENTS
4,704,628 11/1987 Chen et al. ...................... 358/126
4,827,339 5/1989 Wada et al. ...................... 358/85

FOREIGN PATENT DOCUMENTS
0173486 7/1988 Japan .
0071392 3/1989 Japan .

Primary Examiner—Howard W. Britton
Assistant Examiner—Michael H. Lee
Attorney, Agent, or Firm—Staas & Halsey

[57] ABSTRACT

A camera assembly is provided having a rotary camera and a fixed camera for outputting an image signal. A switching unit receives the image signal from the rotary and fixed cameras and switches between them. The rotary camera rotates on a rotary stand drive. A control unit receives an operation signal and a speaker position signal from an operation panel and a speaker detection unit, respectively. The control unit outputs drive signal and/or switch signal based on the operation signal and/or speaker position signal to control a compression rate. An image coding unit codes the image signal from the control unit and the switching unit. The image coding unit determines a fixed compression rate so as to place primary importance on a movement of the image until the image coding unit receives an operation completion signal from the control unit after receiving the operation notice signal.

6 Claims, 9 Drawing Sheets

CHANGE OF IMAGE BY TV → TIME

FIRST MODE

SECOND MODE

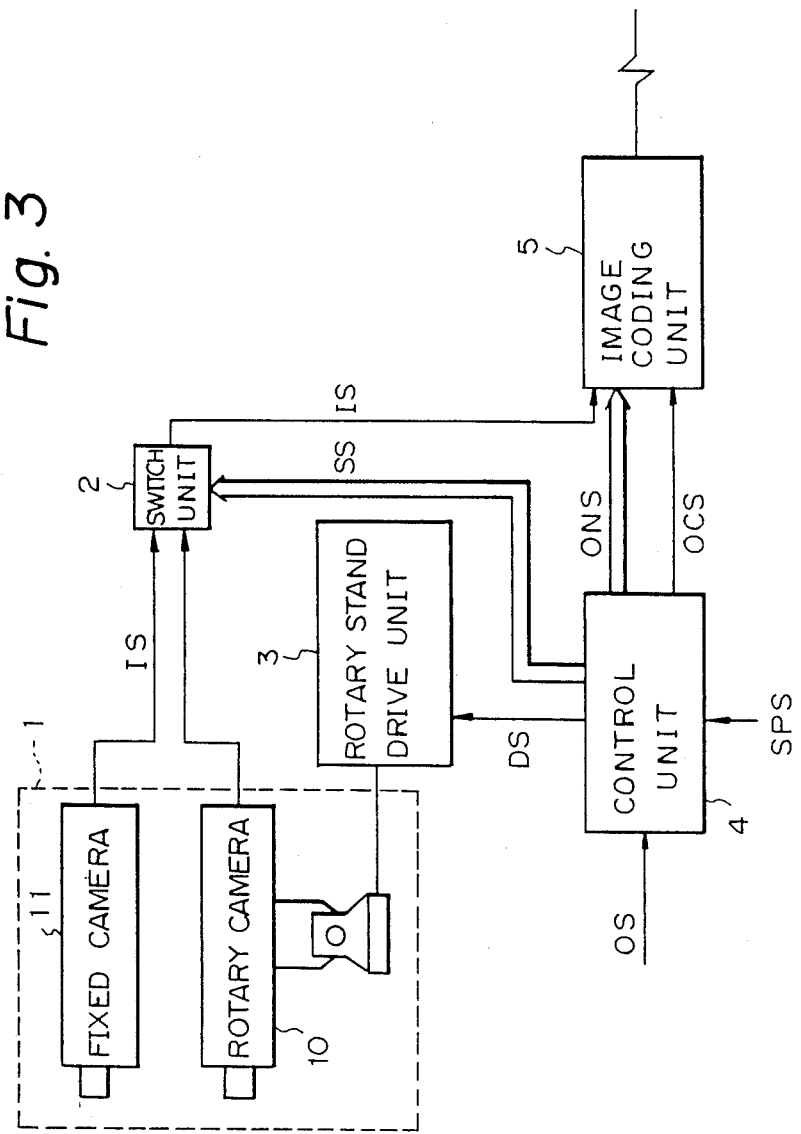

IMAGE PROCESSING SYSTEM FOR TELECONFERENCE SYSTEM

BACKGROUND OF THE INVENTION

1. Field of the Invention

The present invention relates to an image processing system for a teleconference system.

2. Description of the Related Art

Recently, teleconferences are usually held between remote places by utilizing a plurality of television cameras and are widely employed. Particularly, the teleconference is utilized for a conference between remote branches of a firm. In the teleconference system, it is necessary to provide a plurality of television receivers (below, TV), TV cameras, and a control system for control thereof. Further, it is necessary to provide a communication line for the control system.

In the teleconference, one of the TV cameras is used for taking an image the attendants, and the other is used for taking the image of the surroundings. In this case, the camera for the attendants is rotated depending on the speaker. While, the camera for the surrounding is not rotated but is fixed to a predetermined location. Accordingly, it is necessary to improve the follow-up characteristics of a visual image when the speaker changes.

SUMMARY OF THE INVENTION

The object of the present invention is to provide an image processing system for a teleconference system enabling an improvement of the follow-up characteristics of a visual image when the speaker changes.

In accordance with the present invention, there is provided an image processing system for a teleconference system comprising: a camera assembly including a rotary camera and a fixed camera for outputting an image signal; a switching unit operatively connected to the rotary camera and the fixed camera for receiving the image signals and switching between them; a rotary stand drive unit operatively connected to the rotary camera for rotating the rotary camera; a control unit operatively connected to an operation panel and a speaker detection unit to receive an operation signal and a speaker position signal, and operatively connected to the rotary stand drive unit and the switching unit to output a drive signal and/or a switching signal based on the operation signal and/or the speaker position signal. Further, the control unit generates an operation notice signal to control a compression rate at a timing when the operation signal or the speaker position signal is input thereto, then, the drive signal and/or the switch signal is output therefrom. An image coding unit is operatively connected to the control unit and the switching unit for coding the image signal, further, the image coding unit determines a fixed compression rate so as to place primary importance on the movement of the image until the image coding unit receives an operation completion signal from the control unit after receiving the operation notice signal.

BRIEF DESCRIPTION OF THE DRAWINGS

In the drawings:

FIG. 3 is basic block diagram of an image processing system according to the present invention;

DESCRIPTION OF THE PREFERRED EMBODIMENTS

Before describing the preferred embodiments, an explanation will be given of a conventional method.

Figure 1:
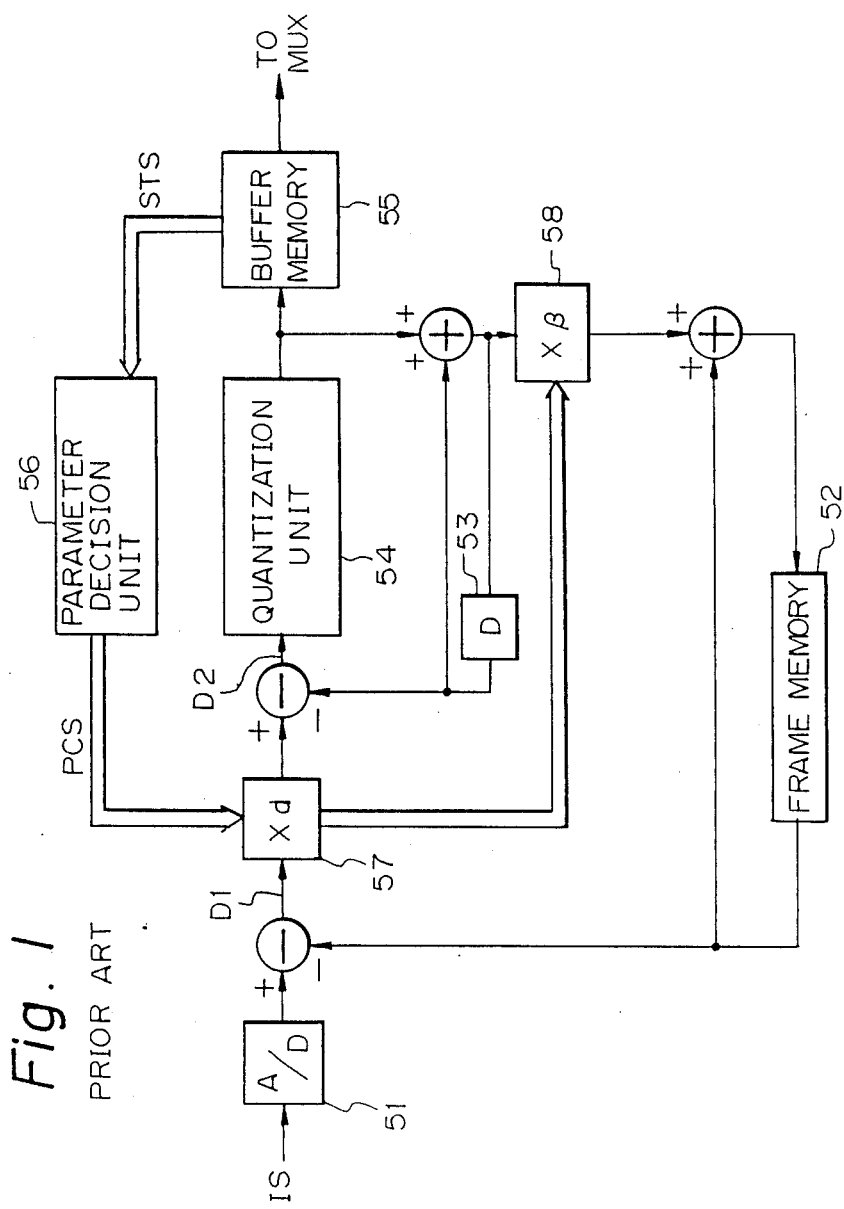
FIG. 1 is a circuit diagram of a conventional image coding circuit for an image processing system.

FIG. 1 is a circuit diagram of a conventional image coding circuit for an image processing system. This circuit is a general circuit used as a coding circuit. In FIG. 1, reference number 51 denotes an analog-to-digital converter, 52 a frame memory, 53 a delay circuit, 54 a quantization circuit, 55 a buffer memory, and 56 a parameter decision unit. Further, 57 and 58 denote parameter setting units.

The image coding circuit is provided for performing compression and expansion the image data in accordance with a predetermined compression/expansion rate for raising transmission efficiency of the image data. In FIG. 1, a rate $\alpha$ (57) denotes a compression coefficient and a rate $\beta$ (58) denotes an expansion coefficient based on an interframe coding method.

There are two type of interframe coding methods, i.e., an intraframe coding and an interframe coding. The former only transmits a difference between adjacent picture elements (intraframe difference). The latter transmits a difference between changed portions of the image (interframe difference). In general, a composite difference method is employed and this method is constituted by combining the above two methods. The frame memory 52 and the buffer memory 55 are provided for temporarily storing previous frame data to transmit the data at a constant speed because the interframe difference information is not uniform in occurrence of time and quantity.

Conventionally, the compression rate $\alpha$ and expansion rate $\beta$ are determined in accordance with the storage state of the buffer memory 55. That is, the storage state STS of the buffer memory is fed back to the parameter decision unit 56 and the parameter decision unit 56 outputs the parameter control signal PCS to determine the compression rate $\alpha$. In this case, when the compression rate $\alpha$ is determined, the expansion rate $\beta$ is automatically determined in accordance with a predetermined ratio ($1/\alpha$) to the compression rate.

The quantization circuit 54 is provided for quantizing the intraframe difference and outputs quantized digital values to the buffer memory 55 and the parameter setting means 58. Accordingly, the compression data is again expanded by the parameter setting means 58 and input to the frame memory 52. Therefore, previous data is always stored in the frame memory 52.

By changing the compression rate α, the image coding circuit usually takes the following three modes (1) to (3) to obtain suitable visual image.

(1) The first mode is a mode in which primary importance is place on an image quality. Accordingly, this mode requires a sacrifice in the follow-up characteristics of the movement of the image. This mode is performed by intermittently (preponderantly) dropping the frame to be transferred.

(2) The second mode is a mode in which primary importance is placed on the follow-up characteristics of the movement of the image. Accordingly, this mode requires a sacrifice in image quality.

(3) The third mode is a mode obtained by dividing intermediate frames into several steps.

In the composite difference method combining the interframe difference and the intraframe difference, the above three modes are determined in accordance with a change of movement of the image compared with a previous frame (i.e., interframe difference). Accordingly, when the change of movement of the image is large (i.e., the interframe difference from the previous frame is large), the mode is gradually moved to the second mode. While, when the change of movement of the image is small (i.e., the interframe difference from the previous frame is small), the mode is gradually moved to the first mode.

Figure 2A:
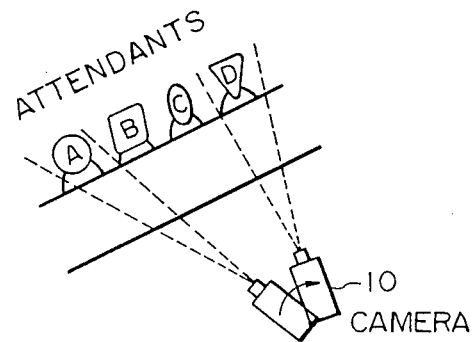
FIGS. 2A to 2C are views for explaining problems of a conventional art.
Figure 2B:
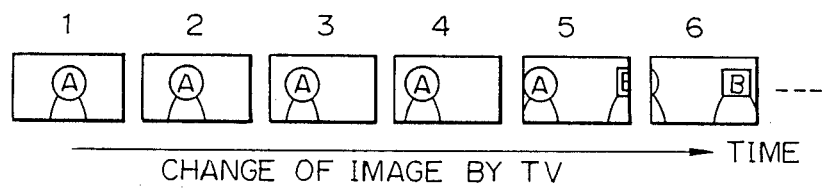
Figure 2C:
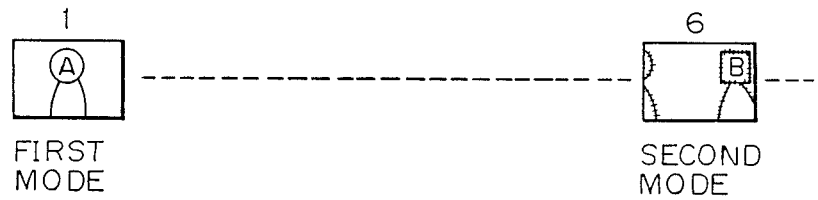

FIGS. 2A to 2C are views for explaining problems of a conventional art. In FIG. 2A, A to D denotes attendants. The reference number 10 denotes a rotary camera which can be rotated in response to the speaker. In FIG. 2B, when the camera 10 rotates from left to right, each of frames 1 to 6 on the TV also changes along with the movement of the camera.

In FIG. 2C, frames 1 and 6 indicate the images after being processed by the image coding circuit. Frame 1 is the image processed by the first mode with primary importance placed on the image quality. In this mode, the compression rate is small. Frame 6 is the image processed by the second mode and does not place primary importance on the image quality. In this case, when the camera rotates, many images drop from the frames 1 to 6 since the mode cannot switch rapidly and only moves gradually from the first to the second. This is because the compression rate cannot change rapidly since the compression rate depends the storage state of the buffer memory 55.

Accordingly, frames 2 to 5 do not change and become stationary frames during this term so that the image quality of the frame deteriorates considerably since the continuity of the image is lost.

An image processing system for a teleconference system according to the present invention is explained in detail hereinafter.

FIG. 3 is basic block diagram of an image processing system according to the present invention. In FIGS. 3, reference number 1 denotes a camera assembly constituted by a fixed camera 11 for taking the surrounding image and a rotary camera 10 for taking the image of the attendants. 2 denotes a switch unit for switching the camera 10 and 11. 3 denotes a rotary stand drive unit for rotating the rotary camera 10. 4 denotes a control unit for receiving an operation signal OS and a speaker position signal SPS and for generating a drive signal DS and a switch signal SS. 5 denotes an image coding unit for coding the image signal IS from the switch unit 2.

The control unit 4 further generates an operation notice signal ONS and an operation completion signal OCS to the image coding unit 5 when the operation signal OS and/or the speaker position signal SPS indicates generation of the drive signal DS and the switching signal SS.

The feature of the present invention lies in the generation of the operation notice signal ONS and the operation completion signal OCS. In the present invention, the operation notice signal ONS can fix the compression rate to the predetermined value regardless the storage state of the buffer memory. Further, the operation completion signal OCS can release the fixed compression rate.

Accordingly, when the image coding unit 5 receives the operation notice signal ONS from the control unit 4, the image coding unit 5 immediately sets the fixed compression rate to obtain the second mode so that it places primary importance on the movement of the image until the image coding unit 5 receives the operation completion signal OCS from the control unit 4.

Figure 4:
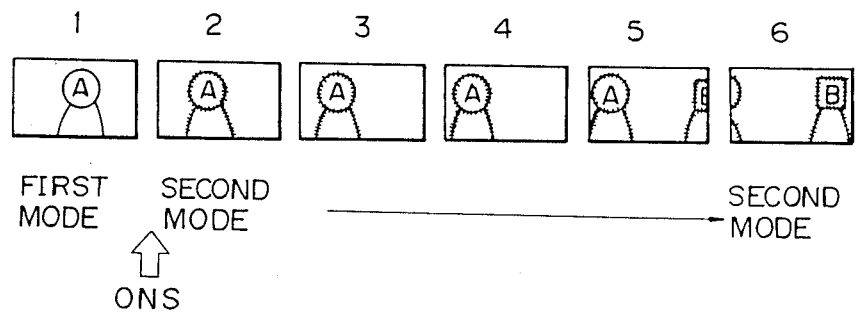
FIG. 4 is a view for explaining a change of frame according to the present invention.

FIG. 4 is a view for explaining a change of frame according to the present invention. In the present invention, when the camera rotates from left to right, the mode is immediately changed from the first mode to the second mode in response to the operation notice signal ONS. That is, frame 1 is set to the first mode for placing primary importance on the image quality. Frame 2 is set to the second mode having the fixed compression rate for placing primary importance on the movement of the image based on the operation notice signal ONS and this mode is continued until frame 6. Accordingly, the control unit 4 sends the drive signal DS and the switch signal SS to the rotary stand drive unit 3 and the switch unit 2 after the image coding unit 5 sets the compression rate of the image to the second mode. In this case, although the image quality of the frame deteriorates as shown by frames 2 to 6, the continuity of the image can be maintained so that a suitable impression can be obtained from by attendants.

When the operation of the rotary stand drive unit 3 or the switch unit 2 is completed, the control unit 4 sends the operation completion signal OCS to the image coding unit 5. When the image coding unit 5 receives the operation completion signal OCS, the mode is immediately returned from the second mode to the normal mode the compression rate of which is variable.

Figure 5:
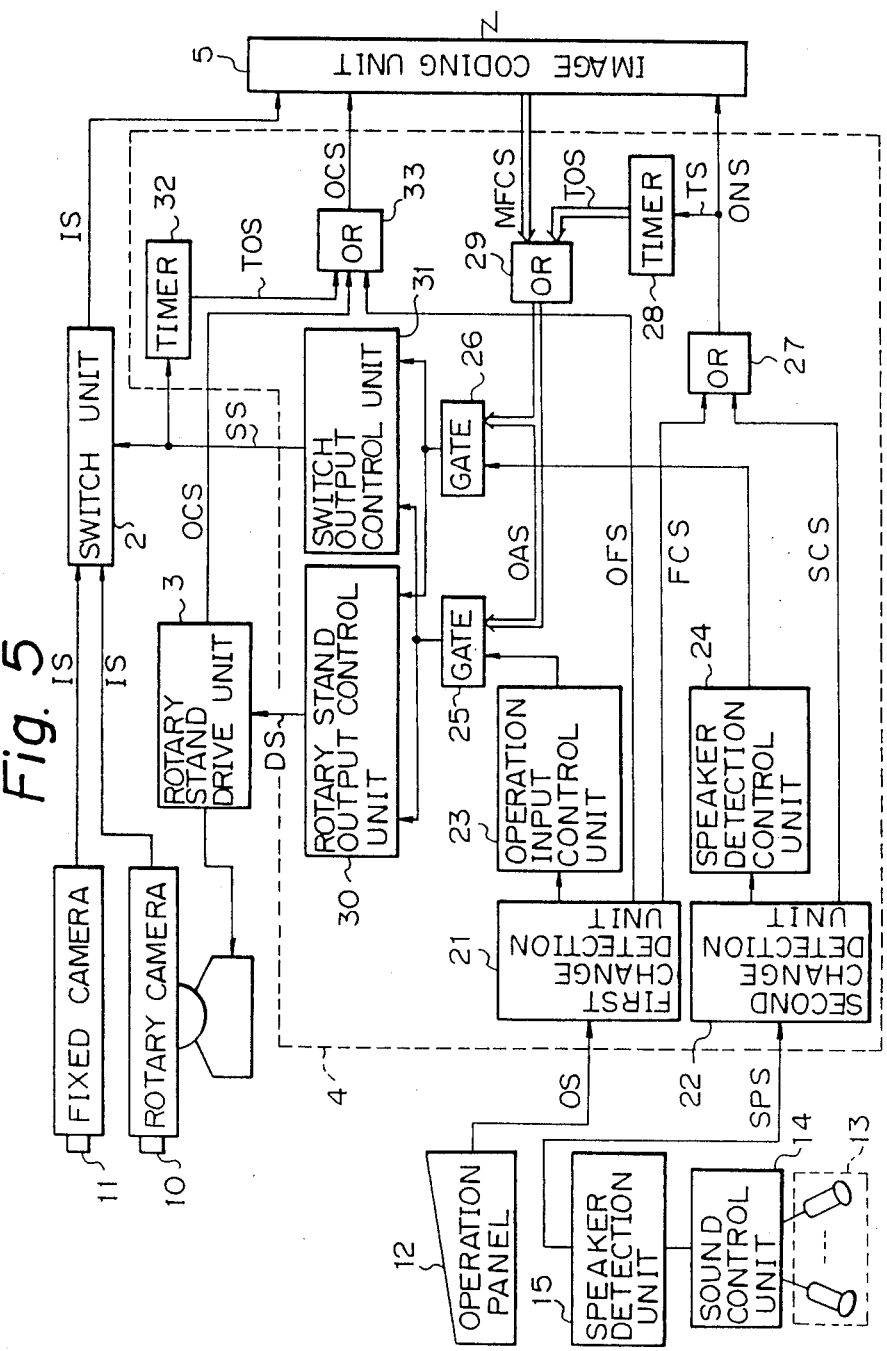
FIG. 5 is a schematic block diagram of an image processing system according to an embodiment of the present invention.

FIG. 5 is a schematic block diagram of the image processing system according to an embodiment of the present invention. The same reference numbers are attached to the same components of FIG. 3. Reference number 12 denotes an operation panel (for example, keyboard) for generating the operation signal OS. 13 denotes a plurality of microphones provided to each attendant. 14 denotes a sound control unit for controlling the sound level of the speaker. 15 denotes a speaker detection unit for detecting the largest sound level and generating the speaker position signal SPS.

The control unit 4 comprises: a first change detection unit 21 for detecting the change of the position, i.e., rotation of the camera based on the operation signal OS input from the operation panel 12; a second change detection unit 22 for detecting the switching of the camera based on the speaker position signal SPS input from the speaker detection unit 15; an operation input control unit 23 and a speaker detection control unit 24 for generating control signals; gates 25 and 26 for passing an operation acknowledge signal OAS which is input thereto, and for holding control signals until the gates are opened; an OR gate 27 for receiving a first change signal FCS and a second change signal SCS and generating the operation notice signal ONS to the image coding circuit 5; a timer 28 for receiving the operation notice signal ONS from the OR gate 27 and generating a time out signal TOS after a predetermined time; an OR gate 29 for receiving a mode fixing completion signal MFCS and the time out signal TOS and generating the operation acknowledge signal OAS; a rotary stand output control unit 30 and a switch output control unit 31 for receiving control signals through the gates 25 and 26, and generating the drive signal DS to the rotary stand drive unit 3 and generating the switching signal SS to the switch unit 2; a timer 32 for receiving a switch signal SS to start the operation and generating a time out signal TOS after a predetermined time; and an OR gate 33 for receiving an operation finish signal OFS from the first change detection unit 21, the operation completion signal OCS from the rotary stand drive unit 3 and the time out signal TOS from the timer 32, and generating the operation completion signal OCS.

Figure 6:
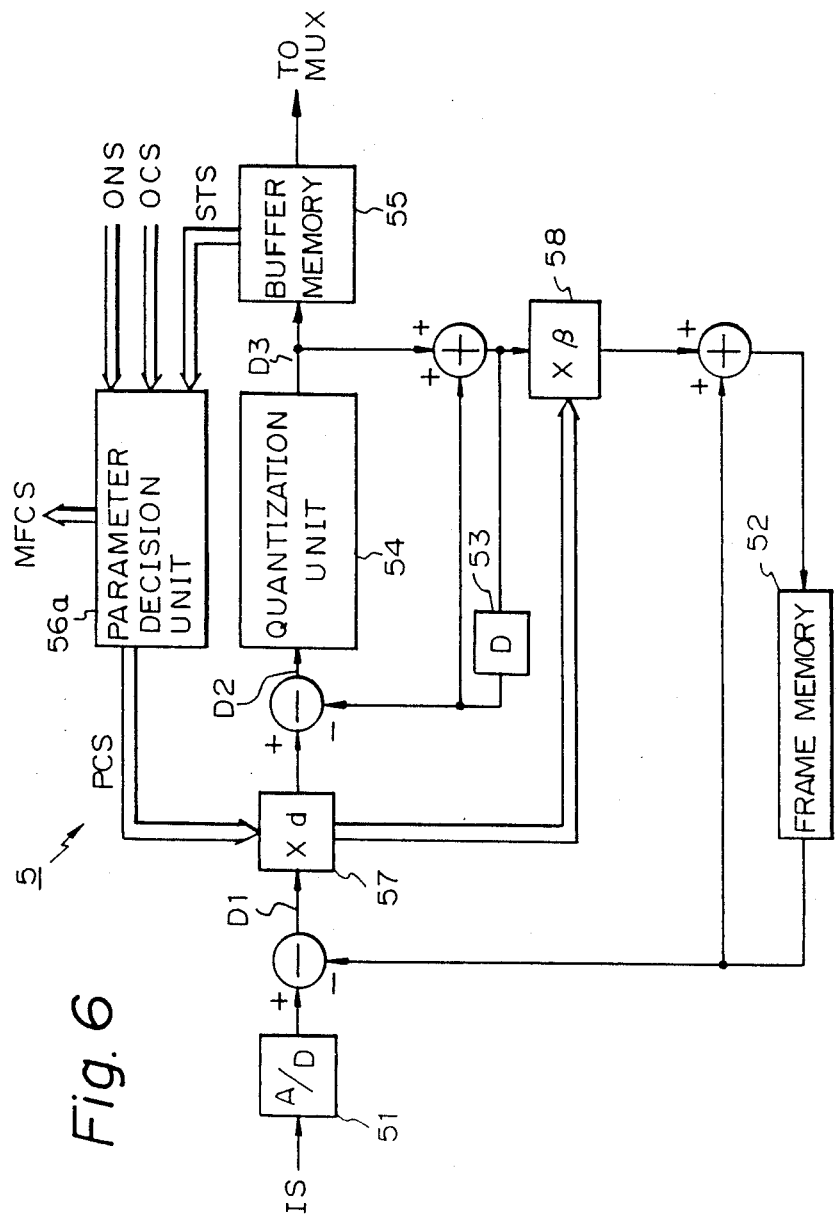
FIG. 6 is a circuit diagram of an image coding circuit according to an embodiment of the present invention.

FIG. 6 is a circuit diagram of the image coding circuit according to an embodiment of the present invention. In FIG. 6, the same reference numbers are attached to the same components shown in FIG. 1 Reference number 56a denotes a parameter decision unit for receiving the operation notice signal ONS, the operation completion signal OCS, and a storage state signal STS, and generating the mode fixing completion signal MFCS and the parameter control signal PCS.

As is obvious from the drawing, the parameter decision unit 56a additionally receives the operation notice signal ONS and the operation completion signal OCS, and outputs the mode fixing completion signal MFCS. As explained above, the operation notice signal ONS is provided for fixing the compression rate $\alpha$ regardless the storage state of the buffer memory 55. Then, when the operation completion signal OCS is input, the fixed compression rate is released and the mode is returned to the normal mode after the operation completion signal OCS is input to the control unit 4.

The analog-to-digital converter unit 51 converts the image signal IS from the switch unit 2 to a digital signal. The interframe difference signal D1 is obtained from the difference between the present frame signal and the frame signal previously stored in the frame memory 52. Further, the compression rate $\alpha$ is multiplied by the interframe difference signal D1. The intraframe difference signal D2 is obtained from the difference between the compressed interframe difference signal and the interframe difference signal delayed by the delay unit 53. The intraframe difference signal D2 is quantized by the quantization unit 54. The quantization signal D3 is stored in the buffer memory 55.

The parameter decision unit 56a generates a parameter control signal PCS to parameter setting units 57, 58 and determines the compression rate $\alpha$ and the expansion rate $\beta$ in accordance with storage quantity of the buffer memory 55 in the normal mode.

As explained above, in the present invention, when the parameter decision unit 56a receives the operation notice signal ONS and the operation completion signal OCS from the control unit 4, the parameter decision unit 56a determines the fixed compression rate $\alpha$. Further, the parameter decision unit 56a outputs the mode fixing completion signal MFCS to the control unit 4 to return to the normal mode.

The operation of the image processing system shown in FIGS. 5 and 6 will be further explained in detail hereinafter.

In general, the image signal IS obtained from the fixed camera 11 or the rotary camera 10 is sent to the image coding unit 5 through the switch unit 2. The image coding unit 5 performs a prediction based on the interframe and the intraframe differences and transmits the coded and compressed image signal to the multi-processing system MUX.

In this case, when the rotary camera 10 is rotated by the operator's operation of the keyboard 12, the operation signal OS is generated and the drive signal DS is input to the gate 25 through the first change detection unit 21 and the operation input control unit 23. In this case, when the switch unit 2 is connected to the fixed camera 11, the switch signal SS is also sent to the gate 25 through the operation input control unit 23.

While, when the fact that an attendant (speaker) has begun to speak is detected by the microphone 13, the sound control unit 14 and the speaker detection unit 15, the speaker position signal SPS is generated from the speaker detection unit 15 and the drive signal DS is input to the gate 26 through the second change detection unit 22 and the speaker detection unit 24. Accordingly, when the first change signal FCS and/or the second change signal SCS is generated from the first and/or second change detection unit and input to the OR gate 27, the operation notice signal ONS in generated from the OR gate 27 and input to the image coding unit 5.

In the image coding unit 5, the parameter decision unit 56a generates the parameter control signal PCS, and sets the parameter setting units 57 and 58 to the fixed compression rates $\alpha$ for entering the second mode. In this case, as explained above, the rate $\alpha$ is the compression coefficient of the interframe difference D1 which is smaller than "1". The rate $\beta$ is the expansion coefficient of the interframe difference D1 which is larger than "1" and corresponds to $1/\alpha$. Accordingly, the intraframe difference D2 becomes a larger value since the interframe difference D1 becomes a smaller value so that the dropping of frames is reduced.

When the rates $\alpha$ are set to the predetermined fixed value, the parameter decision unit 56a generates the mode fixing completion signal MFCS to the control unit 4.

When the OR gate 29 of the control unit 4 receives the mode fixing completion signal MFCS, the OR gate 29 generates the operation acknowledge signal OAS to the gates 25 and 26. In this case, the operation acknowledge signal OAS is also generated from the OR gate 29 when the mode fixing completion signal MFCS is not input from the image coding circuit 5 after the operation notice signal ONS was input to the image coding circuit 5 and a predetermined amount of time has lapsed.

When the gates 25 and 26 receive the operation acknowledge signal OAS, the control signals are applied to the rotary stand output control unit 30 and the switch output control unit 31. Accordingly, the rotary stand output control unit 30 generates the drive signal DS to the drive unit 3 and the switch output control unit 31 generates the switch signal SS to the switch unit 2. When the movement of the camera 10 is finished, the rotary stand drive unit 3 generates the operation completion signal OCS to the OR gate 33. The OR gate 33 also generates the operation completion signal OCS when the timer output signal TOS or the operation finish signal OFS is input to the OR gate 33.

Further, the operation completion signal OCS is input to the parameter decision unit 56a of the image coding circuit 5. When the parameter decision unit 56a receives the operation completion signal OCS, the parameter decision unit 56a releases the mode fixing completion signal MFCS so that the second mode is returned to the first mode which places primary importance on the image quality. In the normal mode, the parameters α and β are changed in accordance with the storage quantity of the data at the buffer memory 55.

Figure 7:
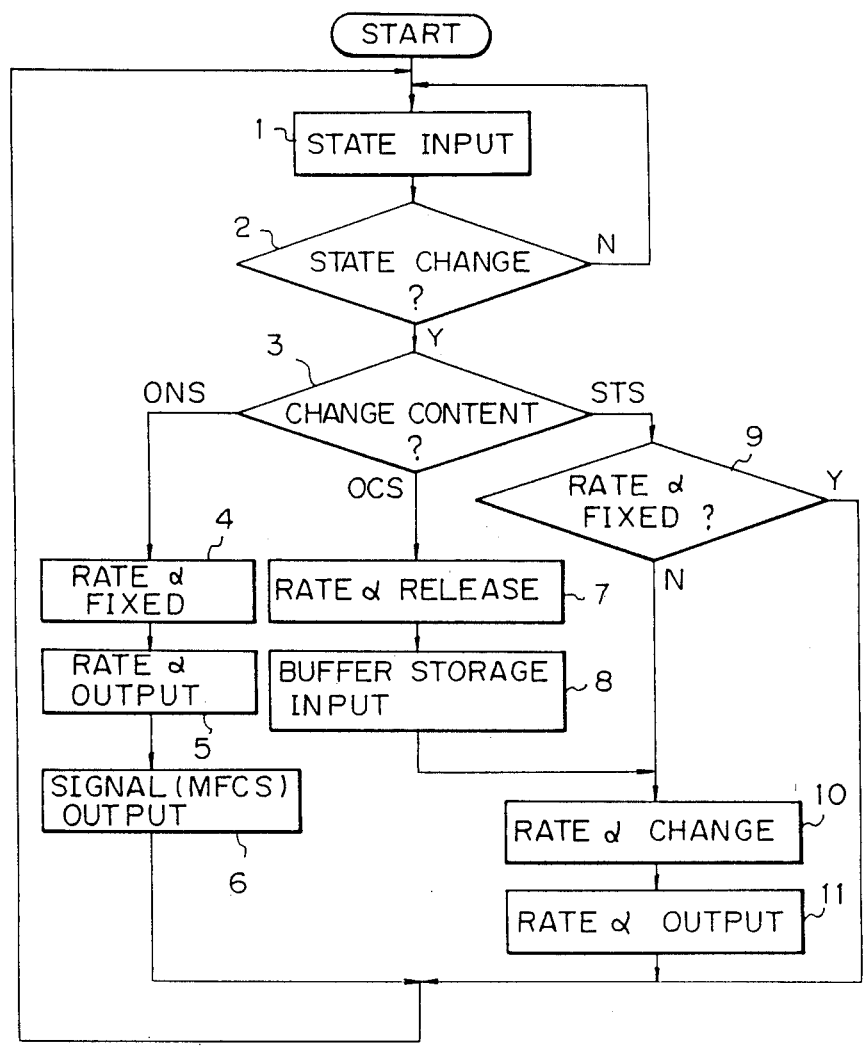
FIG. 7 is a flowchart for explaining a processing at a parameter decision unit shown in FIG. 6.

FIG. 7 is a flowchart for explaining in detail the processing in the parameter decision unit.

When the operation signal OS or the speaker position signal SPS is input to the control unit 4 as a change signal of the surrounding state (1), the control unit 4 detects the change of the state (2). The parameter decision unit 56a detects the content of the change (3). When the operation notice signal ONS is input to the parameter decision unit 56a, the compression rate α is determined to indicate the second mode which places primary importance on the movement of the image (4). When the fixed compression rate α is output to the parameter setting units 57 and 58 (5), the parameter decision unit 56a generates the mode fixing completion signal (6).

In step (3), when the operation completion signal OCS is input to the parameter decision unit 56a, the rate α is released to return to the normal mode in the parameter setting unit 57 (7) and the storage state signal STS is input from the buffer memory 55 to the parameter decision unit 56a (8) to determine the normal compression rate.

In step (3), when the signals ONS and OCS are not input to the parameter decision unit 56a, the storage state of the buffer memory 55 is detected in the parameter decision unit 56a based on the store state signal STS, and the parameter decision unit 56a judges whether or not the compression rate α should be changed (9). When the compression rate α is not fixed, the compression rate α is changed in accordance with the storage state of the buffer memory 55 (10) and the parameter decision unit 56a outputs a new compression rate α to the parameter setting unit 57 (11).

Figure 8:
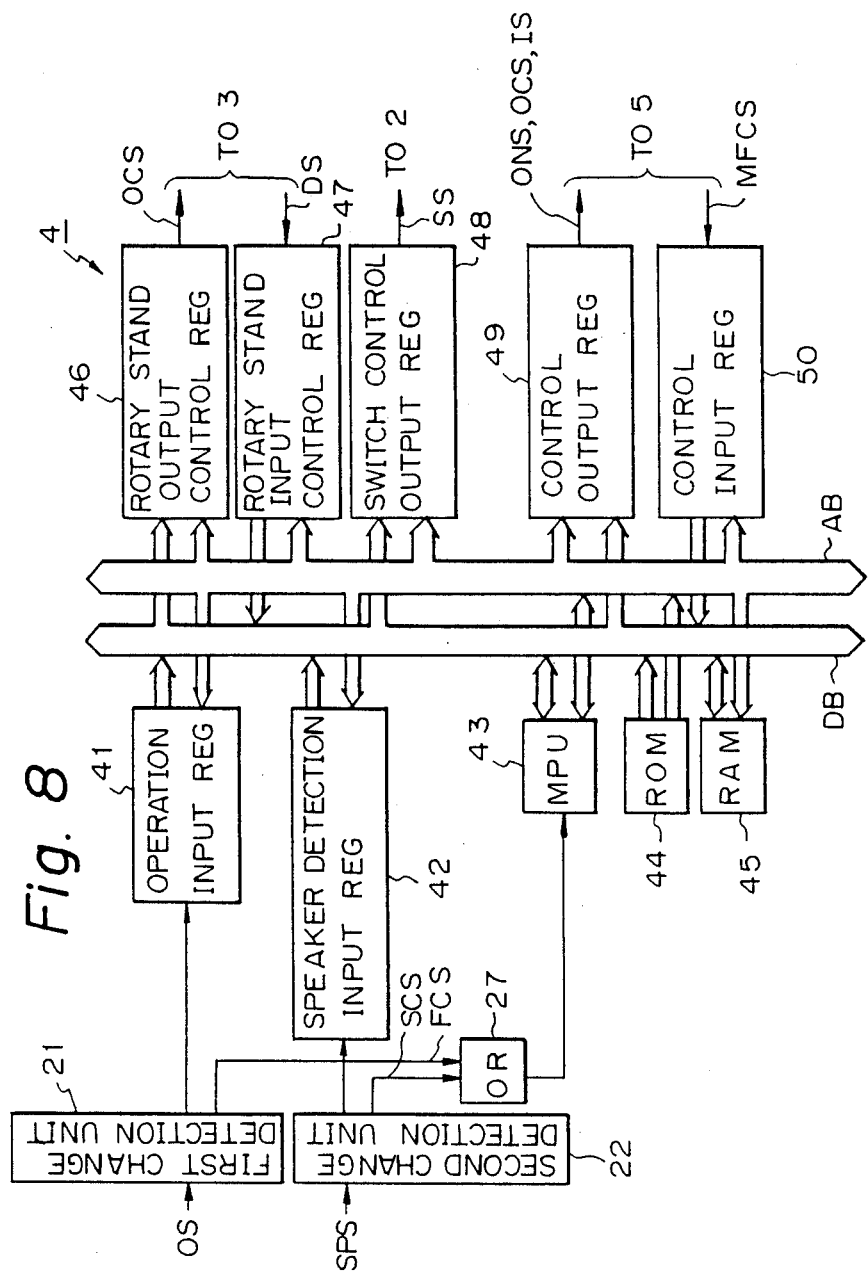
FIG. 8 is a schematic block diagram of a control unit according to another embodiment of the present invention.

FIG. 8 is a schematic block diagram of a control unit according to another embodiment of the present invention. This structure of the control unit 4 is applied to the processing operation using software. In FIG. 8, reference number 41 denotes an operation input register which corresponds to the operation input control unit 23 in FIG. 5. 42 denotes a speaker detection input register which corresponds to the speaker detection control unit 24 in FIG. 5. 46 denotes a rotary stand control output register and 47 a rotary stand control input register, both registers correspond to the rotary stand output control unit 30 in FIG. 5. 48 denotes a switch control output register which corresponds to the switch output control unit 31. Further, a control output register 49 and a control input register 50 are provided as interfaces between the control unit 4 and the image coding circuit 5. 43 denotes a microprocessor, 44 a read only memory and 45 a random access memory, DB a data bus, and AB an address bus.

Figure 9:
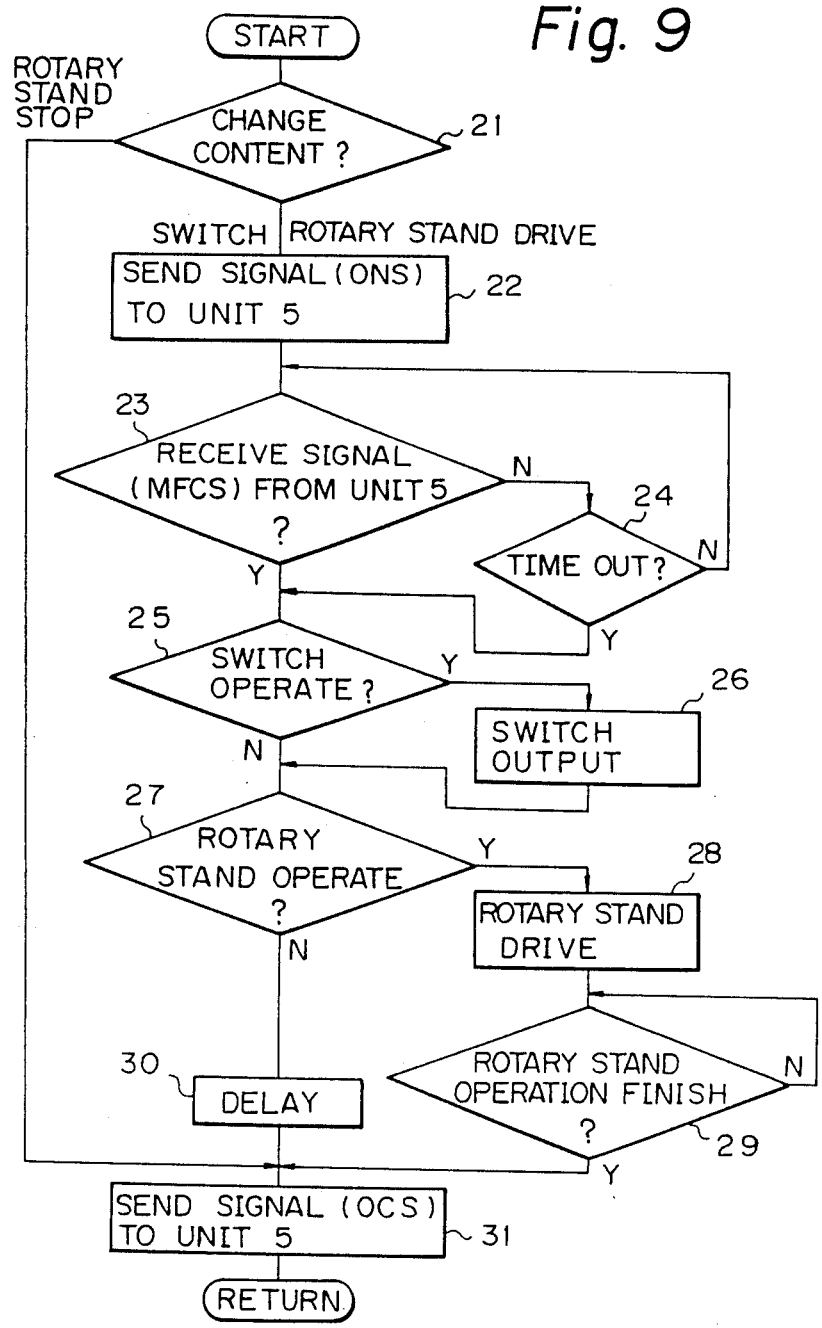
FIG. 9 is a flowchart for explaining a processing at a microprocessor shown in FIG. 8.

FIG. 9 is a flowchart for explaining the processing at the microprocessor. The change of the state is detected in the first and second change detection units 21 and 22 (21). When the change of the state is detected as the operation of the rotary stand or the switching of the switch unit, a fixed mode setting signal, i.e., the operation notice signal ONS is sent to the parameter decision unit 56a of the image coding unit 5 through the control output register 49 (22) and the parameter decision unit 56a determines the compression rate α. The control unit 4 judges whether or not it receives the mode fixing completion signal MFCS from the image coding circuit 5 (23). When the mode fixing completion signal MFCS is not received, the time out is checked in the control unit 4 (24).

When the setting of the fixed mode of the parameter is completed, it is checked whether or not the signal from the register 41 or the register 42 denotes the switch signal SS (25). When the signal denotes the switch signal, the switch unit 2 is switched by the switch control output register 48 (26). Further, it is checked whether or not the signal suggesting the operation of the rotary stand is reached (27). When the signal is reached, the drive signal is applied to the rotary stand drive unit 3 through the rotary stand control output register 46 (28). Further, it is checked whether or not the operation of the rotary stand is finished through the rotary stand input register 47 (29). When the operation is completed, the operation completion signal OCS is sent to the image coding unit 5 through the control output register 49 to release the setting of the fixed mode (31). Further, when the rotary stand is not operated, the transmission of the operation completion signal OCS is delayed by the timer for a constant time.

What is claimed is:

1. An image processing system for a teleconference system comprising:

a camera assembly including a rotary camera and a fixed camera for outputting an image signal;

a switching means operatively connected to said rotary camera and said fixed camera, for receiving said image signal and switching between them;

a rotary stand drive means operatively connected to said rotary camera for rotating said rotary camera;

a control means operatively connected to an operation panel and a speaker detection means to receive an operation signal and a speaker position signal, and operatively connected to said rotary stand drive means and said switching means to output a drive signal and/or a switch signal based on said operation signal and/or said speaker position signal, said control means further generating an operation notice signal to control a compression rate at a timing when said operation signal or said speaker position signal is input thereto, and then, said drive signal and/or said switch signal is output therefrom; and an image coding means operatively connected to said control means and said switching means for coding said image signal, said image coding means further determining a fixed compression rate so as to place primary importance on a movement of said image until said image coding means receives an operation completion signal from said control means after receiving said operation notice signal.

2. An image processing system as claimed in claim 1, wherein said control means comprises a first OR gate for generating said operation notice signal to said image coding means based on said operation signal and said speaker position signal, a second OR gate for receiving a mode fixing completion signal from said image coding means, and a third OR gate for outputting said operation completion signal.

3. An image processing system as claimed in claim 1, wherein said control means further comprises a first timer for receiving said operation notice signal and outputting a time out signal after a predetermined time has lapsed, and a second timer for receiving said switch signal and outputting a time out signal after a predetermined time has lapsed.

4. An image processing system as claimed in claim 1, wherein said image coding means comprises a parameter decision unit for receiving said operation notice signal, generating a parameter control signal for determining said fixed compression rate, and generating said mode fixing completion signal to said control means after receiving said operation completion signal.

5. An image processing system as claimed in claim 2, wherein said control means further comprises a first timer for receiving said operation notice signal and outputting a time out signal after a predetermined time has lapsed, and a second timer for receiving said switch signal and outputting a time out signal after a predetermined time has lapsed.

6. An image processing system as claimed in claim 2, wherein said image coding means comprises a parameter decision unit for receiving said operation notice signal, generating a parameter control signal for determining said fixed compression rate, and generating said mode fixing completion signal to said control means after receiving said operation completion signal.

* * * * *